United States Patent [19]
Uddenfeldt

[11] Patent Number: 5,805,633
[45] Date of Patent: Sep. 8, 1998

[54] METHOD AND APPARATUS FOR FREQUENCY PLANNING IN A MULTI-SYSTEM CELLULAR COMMUNICATION NETWORK

[75] Inventor: Jan Uddenfeldt, Hässelby, Sweden

[73] Assignee: Telefonaktiebolaget L M Ericsson, Stockholm, Sweden

[21] Appl. No.: 524,346

[22] Filed: Sep. 6, 1995

[51] Int. Cl.[6] .................................................. H04B 1/713
[52] U.S. Cl. .......................... 375/202; 375/203; 370/330; 370/335; 370/337; 455/454
[58] Field of Search .................... 375/200, 202, 375/356, 203, 206; 370/328, 329, 330, 335, 337, 342, 344, 347; 455/448, 454, 450

[56] References Cited

U.S. PATENT DOCUMENTS

| | | | |
|---|---|---|---|
| 4,144,496 | 3/1979 | Cunningham et al. | 455/447 |
| 5,034,993 | 7/1991 | Sasuta et al. | 455/11 |
| 5,040,238 | 8/1991 | Comroe et al. | 455/520 |
| 5,159,695 | 10/1992 | Comroe et al. | 455/9 |
| 5,193,101 | 3/1993 | McDonald et al. | 375/200 |
| 5,224,121 | 6/1993 | Schorman | 375/202 |
| 5,247,701 | 9/1993 | Comroe et al. | 455/520 |
| 5,257,398 | 10/1993 | Schaeffer | 455/452 |
| 5,301,188 | 4/1994 | Kotzin et al. | 370/330 |
| 5,349,342 | 9/1994 | Nilles et al. | 340/825.08 |
| 5,365,571 | 11/1994 | Rha et al. | 455/446 |
| 5,404,576 | 4/1995 | Yahagi | 455/524 |
| 5,408,496 | 4/1995 | Ritz et al. | 375/202 |
| 5,420,851 | 5/1995 | Seshadri et al. | 370/280 |
| 5,450,395 | 9/1995 | Hostetter et al. | 370/320 |
| 5,483,666 | 1/1996 | Yamada et al. | 455/454 |
| 5,586,120 | 12/1996 | Cadd | 370/468 |
| 5,594,720 | 1/1997 | Papadopoulos et al. | 370/330 |

OTHER PUBLICATIONS

*Spectrum Sharing Through Dynamic Channel Assignment for Open Access to Personal Communications Services*, by Hector Salgado, Marvin Sirbut, and Jon Peha; Jun. 18, 1995; pp. 417–422.

ICC '95 Seattle Communications –Gateway to Globalization, 1995, IEEE International Conference on Communications, vol. 1, 18–22, Jun. 1995, Seattle, WA, US, pp. 417–422, XP 000533021, H. Salgado, et al. "Spectrum Sharing through Dynamic Channel Assignment for Open Access to Personal Communications Services."

*Primary Examiner*—Young T. Tse
*Attorney, Agent, or Firm*—Jenkens & Gilchrist, P.C.

[57] ABSTRACT

A method and apparatus for frequency planning in a multi-system cellular communications network is disclosed in which a plurality of systems operate over a frequency range comprising a plurality of frequency bands. The systems each provide communications services to a plurality of subscribers located within substantially the same geographic region. Each of the systems is assigned one or more of the network frequency bands for use as control channels. The systems then share the unassigned frequency bands to provide communications service. The systems may share the frequency bands without coordination or synchronization or, as an alternative, the sharing may be controlled by a processor.

41 Claims, 13 Drawing Sheets

Time Slot

TDMA Frame

Multiframe

7/21 CELL PATTERN

4/12 CELL PATTERN

3/9 CELL PATTERN

METHOD AND APPARATUS FOR FREQUENCY PLANNING IN A MULTI-SYSTEM CELLULAR COMMUNICATION NETWORK

BACKGROUND OF THE INVENTION

1. Field of the Invention

The present invention relates to the field of cellular communication systems and, more specifically, to a method and apparatus for frequency planning in a multi-system cellular communications network.

2. History of the Prior Art

Efficient use of the available electromagnetic spectrum has long been a focus of interest in the design and management of cellular radio communication systems. In order to efficiently utilize the available electromagnetic spectrum, cellular systems designers and operators have continually sought to increase the spectral efficiency of cellular systems. The spectral efficiency of a system is defined as the number of simultaneous conversations (i.e., capacity) per megahertz per square kilometer that the system can carry.

An example of a method by which the spectral efficiency of a system may be increased is frequency division multiple access (FDMA). FDMA was conceived as a way to increase spectral efficiency by providing a means for the geographic re-use of a limited number of frequencies. In FDMA, a frequency range is divided into a number of smaller frequency bands. In practice, each user in a FDMA system is assigned a carrier frequency which is modulated with an information bearing signal. The modulated carrier frequency occupies a frequency band.

A second way of increasing spectral efficiency is by reducing co-channel interference within a cellular network. Co-channel interference arises when multiple users simultaneously operate in the same frequency bands. In digital communication systems, co-channel interference can be reduced by using digital transmission techniques and methods, such as interleaving and coding. In such systems the same quality of service can be provided at much higher levels of co-channel interference as compared to analog systems. The use of digital transmission in cellular communication systems therefore allows more efficient reuse of frequency bands, resulting in improved spectral efficiency.

Further increases in spectral efficiency may be accomplished through the combined use of FDMA and other various multiple access methods, such as time division multiple access (TDMA) and code division multiple access (CDMA). TDMA, for example, has been successfully employed in many second generation cellular systems, such as, the pan-European GSM-900 and the North American D-AMPS (IS-54B) systems.

GSM-900, for example, uses a combined multiple access format whereby each FDMA frequency band is divided in time into TDMA frames, each consisting of 8 time slots as shown in FIG. 1B. One time slot of a TDMA frame on one modulated carrier is referred to as a physical channel. The information broadcast over a physical channel is referred to as a burst and is shown in FIG. 1A.

GSM-900 requires a great variety of information to be transmitted between the mobile station and the base station, e.g., user data and control signaling. Different kinds of information are transmitted on different logical channels. The logical channels are mapped onto the physical channels as shown in FIG. 1C. Speech, or data, is transmitted over the traffic channels (TCH). Signaling, broadcast, and synchronization information are transmitted over the control channels which are subdivided into three types: broadcast (BCH), common control channels (CCCH), and dedicated control channels (DCCH).

FIG. 2A illustrates the GSM-900 frequency range allocation. Signals transmitted from a mobile station to the base station are referred to as the uplink and, conversely, signals transmitted from the base station to the mobile station are referred to as the downlink. Throughout most of Europe, GSM-900 has been allocated the frequency range 890 to 915 MHz for the uplink and 935 to 960 MHz for the downlink. GSM-900 uses a frequency duplex arrangement where uplink and downlink frequencies are separated in frequency by 45 MHz. The GSM-900 carrier spacing is 200 kHz resulting in 124 discrete frequency bands. There are, therefore, 124 carriers times 8 time slots, or 992 physical channels available for use in GSM-900.

The frequency bands are licensed to certain entities which are thereby given permission to operate radio equipment in these frequency bands. Commonly referred to as operators, these entities are responsible for installing, operating and maintaining the necessary radio communications equipment in a certain geographic region to provide the service for which they have been given a license. Systems controlled by a particular operator are referred to herein as independent radio communication systems. In most cases, independent radio communication systems are assigned a portion of a cellular frequency band over which they may provide a specific service in a specific geographic region. In practice, where there is more than one independent radio communication system, guard bands have to be provided between the frequency bands allocated to each system, and thus the number of actual frequency bands available is less than the maximum. FIG. 2B illustrates an example where two independent radio communication systems occupy a contiguous portion of the frequency range separated by a single guard band. In practice, each independent radio communication system may not be allocated contiguous frequency bands and more than one guard band may be necessary. From the allocated frequency bands, each independent radio communication system must also assign one or more fixed control channels which are used to manage the traffic over the remaining traffic channels.

In prior art cellular systems, groups of frequencies are allocated among the cells of the system so as not to interfere with one another. The distribution of the carrier signal power to interference power ratio (C/I) desired in a system determines the number of frequency groups, F, which may be used. If the total allocation of N channels available to the system is partitioned into F groups then each group will contain N/F channels. Since the total number of channels is fixed, a smaller number of frequency groups results in more channels per cell site. Therefore, a reduction in the number of frequency groups allows each cell site to carry more traffic, reducing the total number of sites for a given traffic load. However, decreasing the number of frequency groups and reducing the co-channel frequency reuse distance results in a lower average C/I distribution in the system and, correspondingly, a reduction in signal link quality.

Various frequency reuse patterns are known, 7/21, 4/12, and 3/9 as shown in FIGS. 3, 4, and 5, respectively. In all three cases, the site geometry has three sectors (cells) at each site with the antenna pointing azimuths separated by approximately 120 degrees and arranged with the antennas pointing at one of the nearest site locations thus forming cells in a cloverleaf fashion.

In the absence of dynamic channel allocation, i.e., with channel frequencies being fixed, each independent cellular communication system operator is required to allocate to each particular base station, or cell site, a certain group of specific carrier frequencies comprising a frequency group F. This is known as frequency, or cell planning. Frequency planning considers the geographic distribution of the mobile stations, the traffic behavior of the subscribers and, the required quality and geographic coverage of the service. Normally, frequency planning is based upon theoretical radio propagation models which use the geographic layout, the proposed base station network structure and frequency allocations as input to predict radio coverage. The hexagons shown in FIGS. 3, 4, and 5 are used as convenient models of a cell's coverage area, but real world planning must consider that radio propagation depends very much on terrain and land surface irregularities. The hexagonal cell is therefore only a rough estimation of the cell's coverage region. In practice, the cell comprises the locus of regional coordinates which may be served by a particular base station. Often, cells are irregularly shaped and not contiguous.

Today, cellular radio communication systems represent a large and continuously increasing percentage of all new telephone systems around the world. With this growth has come an increasing amount of competition in the form of a larger number of independent radio communication systems and a growing number of alternate wireless services serving each region. In the United States, for example, the original duopoly scheme mandated by the FCC for each geographic region is being challenged in many regions by new operators who wish to provide cellular service. In countries outside the United States, where there is no regulated duopoly, the number of competing independent radio communication systems serving a particular geographic region is limited only by the availability of licensed frequency bands. In Sweden, for example, most geographic regions are served by at least three independent radio communication systems. In addition to conventional voice communication, the emergence of newly developing wireless data services operating in the cellular band will likely increase the number of operators seeking to have access to frequencies in the cellular band. Also, newly developing wireless technologies in newly available frequency bands such as personal communication service (PCS) promise to further increase the availability of services and competition in years to come.

The assignment of frequency bands to independent radio communication systems is usually controlled by national regulatory agencies. In the United States, for example, the Federal Communications Commission (FCC) controls the usage of the radio frequency spectrum and awards licenses on the basis of auctions or other forms of competitive bidding. In frequency-planned FDMA based systems, the management of allocated frequencies has to be carefully controlled so that independent radio communication systems may serve a given region without interfering with one another. The introduction of a single new independent radio communication system in any given geographic region requires the entire frequency plan of the existing independent radio communication systems to be re-engineered. As the number of independent radio communication systems licensed to operate in any given band increases, the problem of frequency planning and resource allocation becomes extremely complicated. Such limitations make it difficult, if not impossible, for new services and new competitors to enter the market in many regions.

The cellular industry is soon facing a new paradigm where providing convenient access for competition may become more important than the need for spectral efficiency. There exists therefore a need to provide easy spectrum access to increased competition and services.

SUMMARY OF THE INVENTION

It is therefore an object of the present invention to simplify the problem of frequency planning in cellular communication network systems. A cellular radio communication network is described which operates over a predetermined frequency range subdivided in frequency into frequency bands. The network comprises a plurality of independent radio communication systems, each designed to provide radio telecommunication service over substantially the same geographic region. A method and apparatus for using the frequency range within the network is described wherein separate frequency bands are assigned from the network frequency range to each of said plurality of independent radio communications systems to be used as control channels. The remainder (unassigned portion) of the frequency range is shared by the plurality of independent radio communication systems to provide radio telecommunication service to a plurality of mobile, or fixed, subscribers located in the same geographic region. Several exemplary embodiments are described with reference to a TDMA cellular communication system.

In a first embodiment of the invention, the unassigned portion of the frequency range is shared without coordination or synchronization between a plurality of independent radio communication systems. In this embodiment, slow frequency hopping across the unassigned frequency bands may be used to reduce co-channel interference between the independent radio communication systems.

In a second embodiment of the invention a portion of the unassigned frequency range is assigned to any one of the plurality of independent radio communication systems, to be used exclusively by that one system in a particular geographic region. The remainder of the assigned portion of the frequency range is shared by all of the plurality of independent radio communication systems to provide radio telecommunication service to a plurality of mobile, or fixed, subscribers located in the same geographic region.

In a third embodiment of the invention the unassigned portion of the frequency range is shared on a coordinated and synchronized manner between each of the plurality of independent radio communication systems. Synchronization is controlled by a processor which provides a master time reference for synchronization. The processor also coordinates and assigns frequency and time slot combinations in response to channel setup requests received from the plurality of independent radio communication systems. Alternatively, the processor may assign frequency hopping patterns in response to channel setup requests received from the plurality of independent radio communications systems.

These and other features and advantages of the present invention will be readily apparent to one of ordinary skill in the art from the following written description, when read in conjunction with the drawings in which like reference labels refer to like elements throughout.

BRIEF DESCRIPTION OF THE DRAWINGS

Embodiments of the invention will now be described in more detail with reference to the accompanying drawings, in which like reference labels refer to like elements throughout.

DETAILED DESCRIPTION

In the following description, specific details are set forth for purposes of explanation and not limitation, such as particular circuits, circuit components, techniques, etc., in order to provide a thorough understanding of the invention. In other instances, detailed descriptions of well-known methods, devices, and circuits are omitted so as not to obscure the description of the present invention with unnecessary detail. Furthermore, for the purposes of exposition, an embodiment of the present invention will be described in connection with the pan-European GSM-900 system. However, it will be apparent to one of ordinary skill in the art that the present invention may be practiced in other embodiments that depart from these specific details.

Figures 1A, 1B, 1C:
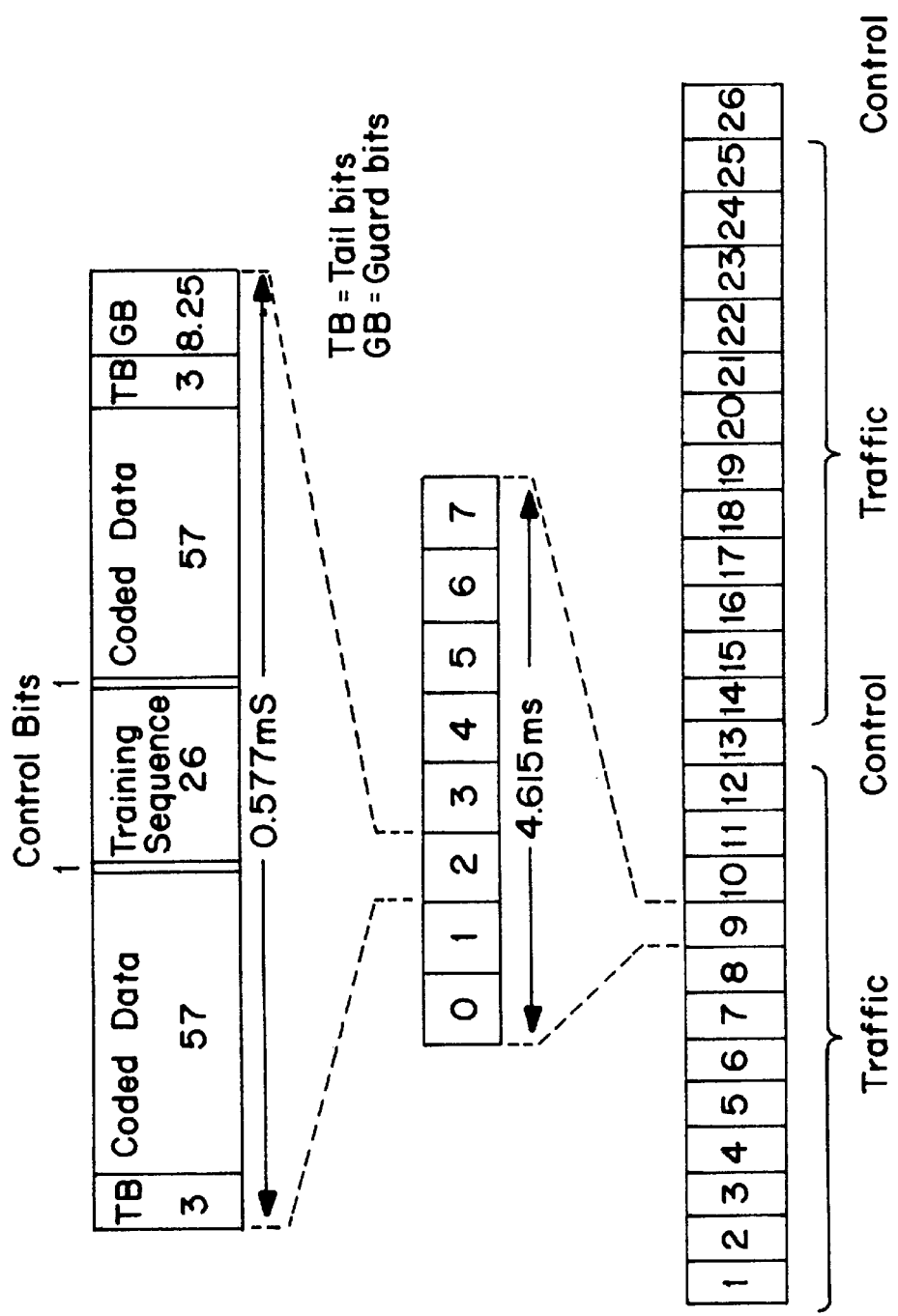
FIG. 1A, previously described, illustrates the GSM time slot.
FIG. 1B, previously described, illustrates the GSM TDMA frame.
FIG. 1C, previously described, illustrates the mapping of logical channels onto the physical channels.
Figure 2A:
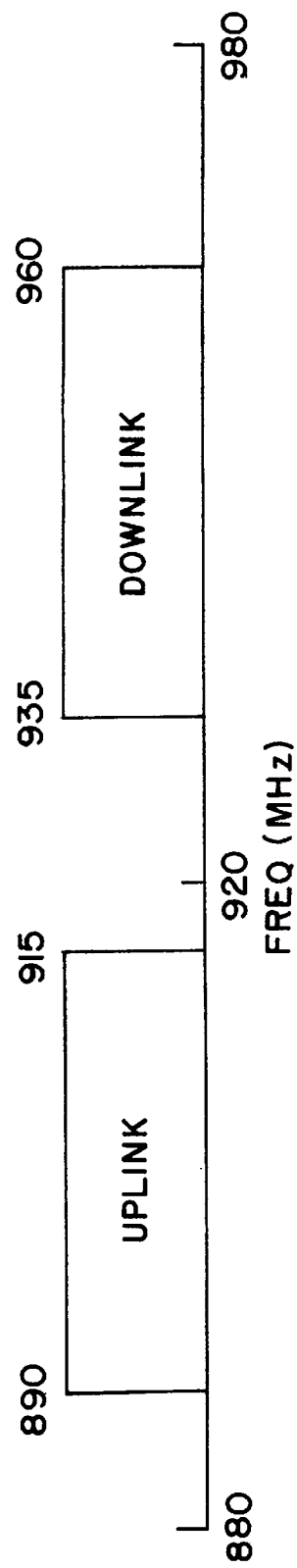
FIG. 2A, previously described, illustrates the GSM frequency range allocation.
Figure 2B:
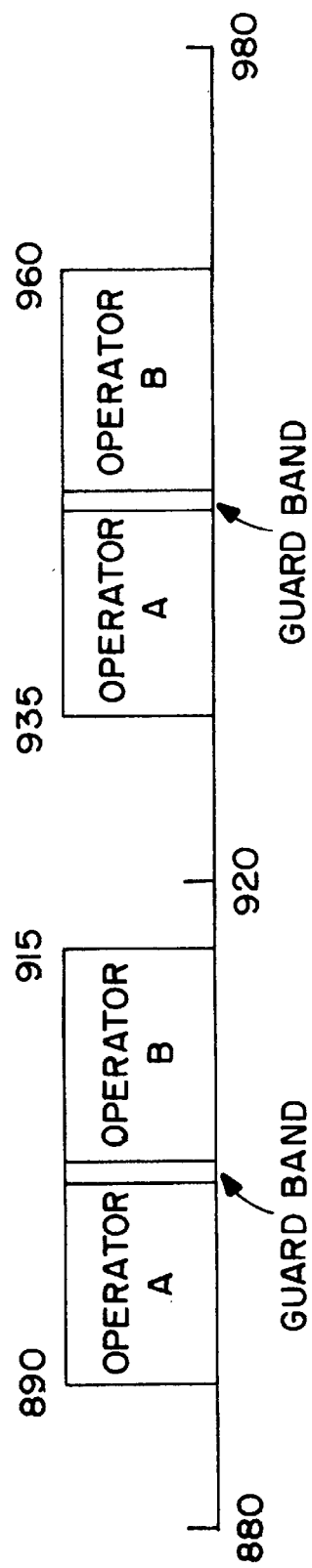
FIG. 2B, previously described, illustrates an example of how two independent radio communication systems are allocated a portion of the frequency range.
Figure 3:
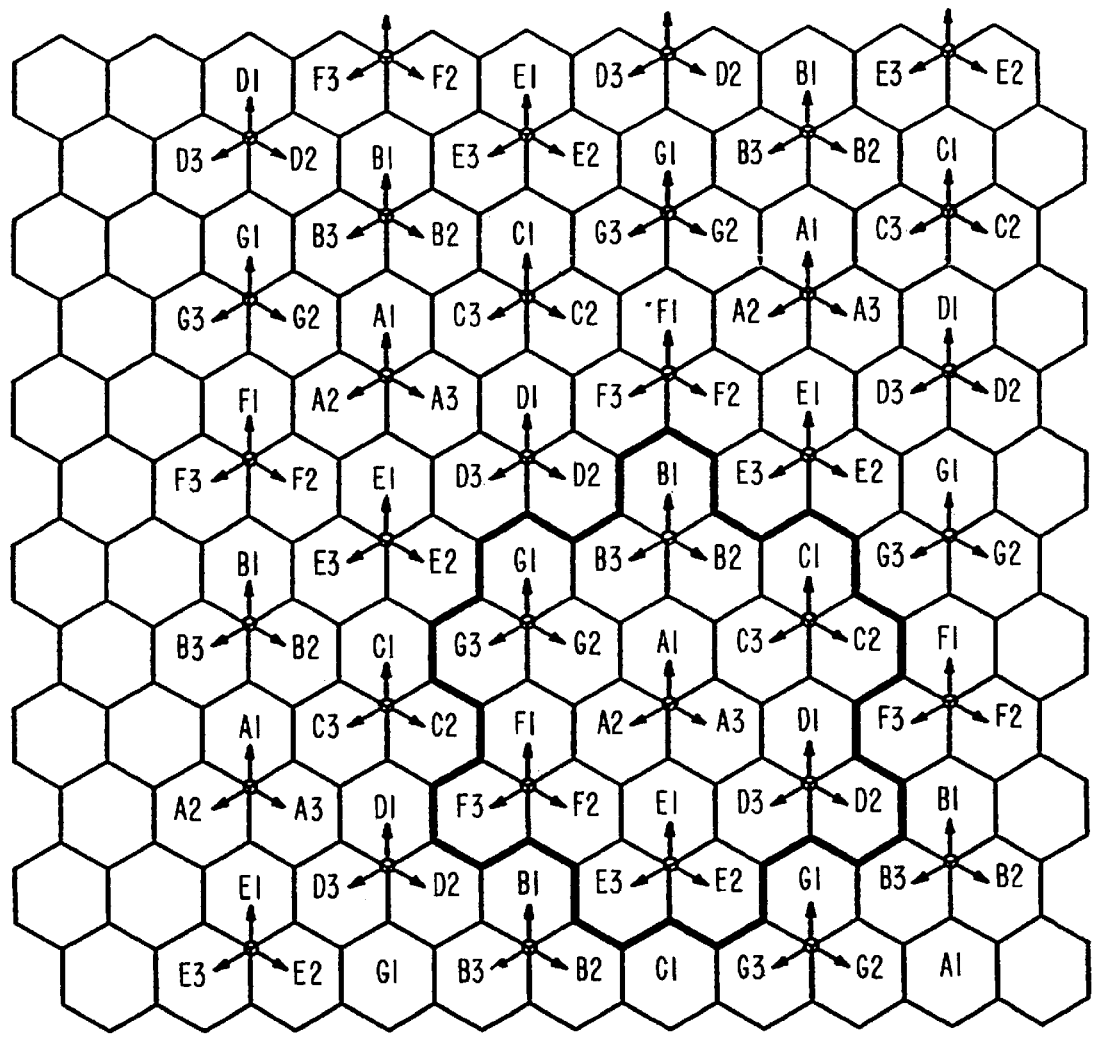
FIG. 3, previously described, is an illustration of a 7/21 cell pattern in a cellular system.
Figure 4:
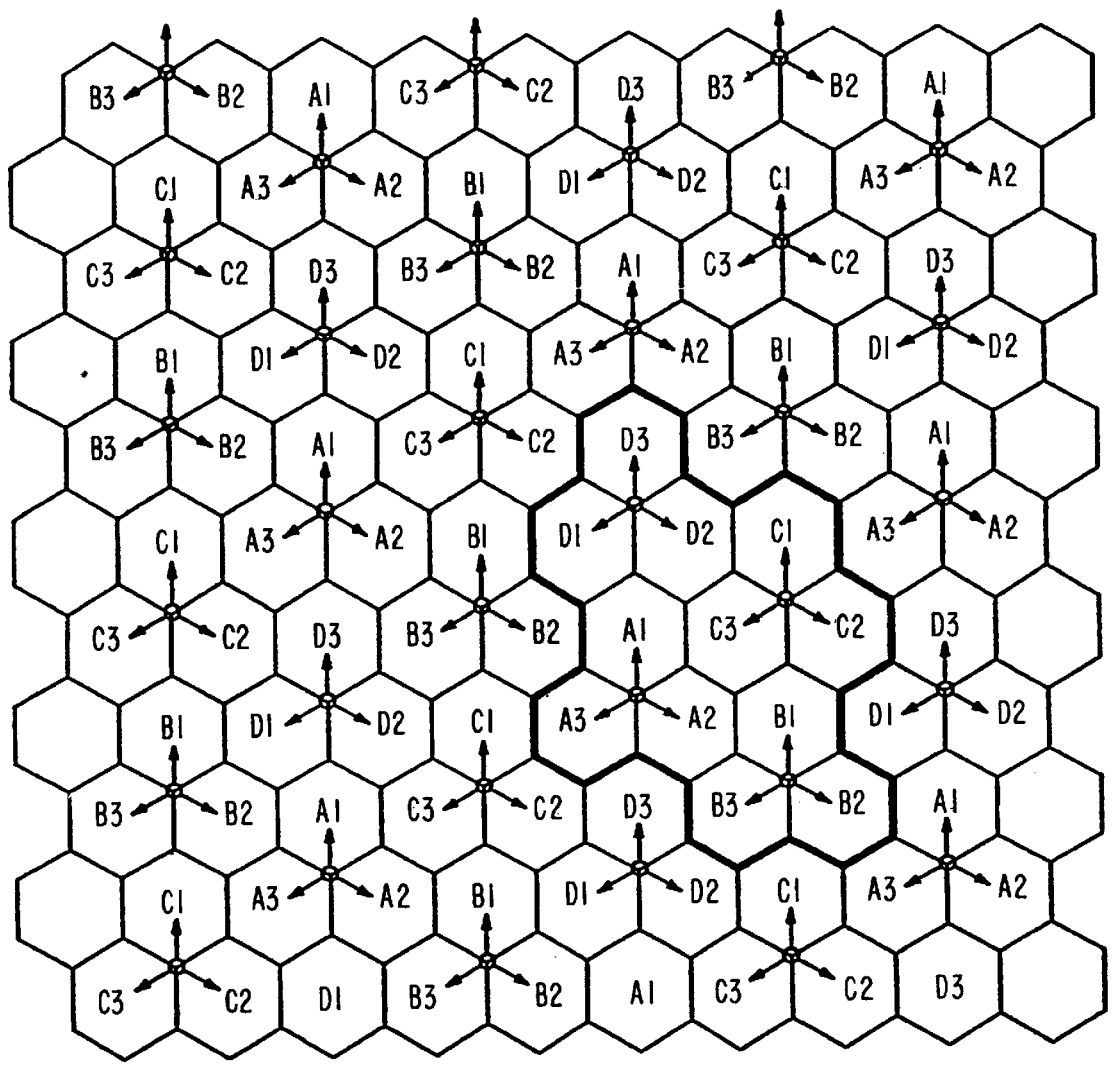
FIG. 4, previously described, is an illustration of 4/12 cell pattern in a cellular system.
Figure 5:
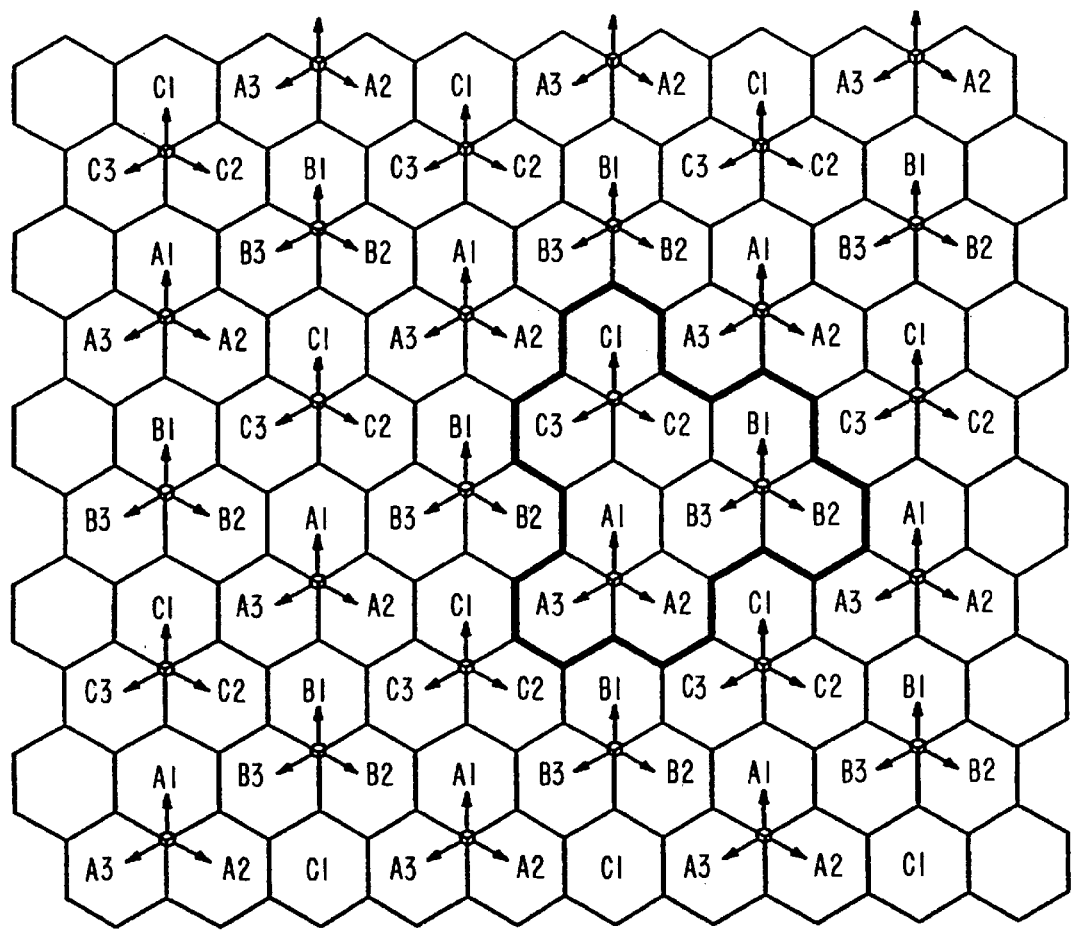
FIG. 5, previously described, is an illustration of 3/9 cell pattern in a cellular system.
Figure 6:
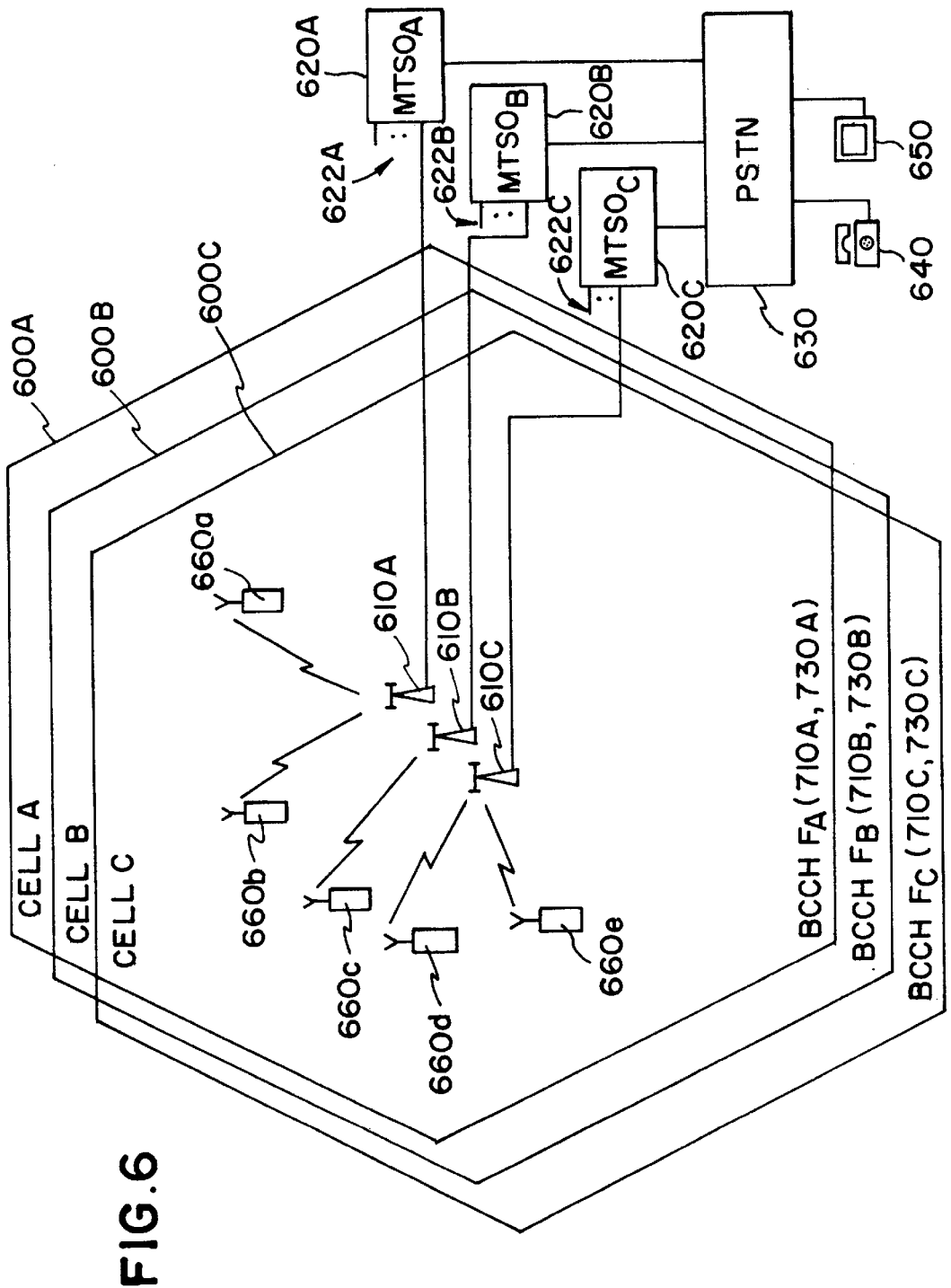
FIG. 6 is an illustration of a cellular network structure according to the present invention.

Referring now to FIG. 6, therein is an illustration of a cellular network structure according to the invention. In FIG. 6, three independent radio communication systems A, B, and C are designed to provide radio telecommunications service over a particular geographic region. For the purposes of exposition only one cell, i.e., geographic coverage region, is shown, but it is obvious to one skilled in the art how this first embodiment may be applied to a region comprising many adjacent and overlapping cells. The embodiment, including three independent radio communications systems, is also for exposition only. According to the present invention there could be any number, N, greater than or equal to two, comprising a plurality of independent radio communication systems. As shown in FIG. 6, cells 600A, 600B, and 600C may be substantially overlapping.

Radio system A, whose constituent parts are identified with the descriptive label A, provides radio coverage to the region labeled Cell A 600A from base station 610A. System A provides communications services to mobile stations 660a and 660b. Base station 610A is connected to mobile telephone switching office ($MTSO_A$) 620A. As generally indicated at 622A, $MTSO_A$ 620A provides the interface to other base stations covering other regions (not shown) which are controlled by radio communication system A. $MTSO_A$ 620A also provides access to the public switched telephone network (PSTN) 630. The PSTN includes wireline telephones 640, computers 650, and other related communication equipment.

Similarly, a second independent radio system, whose constituent parts are identified with the descriptive label B provides radio coverage to the region labeled Cell B 600B from base station 610B. System B provides communications services to mobile station 660c. Base station 610B is connected to mobile telephone switching office ($MTSO_B$) 620B. As indicated by FIG. 6, $MTSO_B$ 620B provides the interface to other base stations covering other regions (not shown) which are controlled by the first independent radio communication system. $MTSO_B$ 620B also provides access to the public switched telephone network (PSTN) 630.

Similarly, a third independent radio system, whose constituent parts are identified with the descriptive label C provides radio coverage to the region labeled Cell C 600C from base station 610C. System C provides communications services to mobile station 660d and 660e. Base station 610C is connected to mobile telephone switching office ($MTSO_C$) 620C. As generally indicated at 622C, $MTSO_C$ 620C provides the interface to other base stations covering other regions (not shown) which are controlled by the first independent radio communication system. $MTSO_C$ 620C also provides access to the public switched telephone network (PSTN) 630.

It should be mentioned here that mobile stations 660a–e may also be fixed subscribers. Radio service to fixed subscribers is commonly known as radio in the local loop (RLL). It will be obvious to one skilled in the art that RLL service can be provided according to the invention in the same manner as service to mobile subscribers without departure from the spirit or scope of the present invention.

In the first embodiment of the invention, independent radio communication systems A, B, and C are designed to provide radio-telecommunication service to substantially overlapping cells 600A–C, respectively, from base stations 610A–C, respectively. As previously mentioned, the hexagonal cell shapes are used to approximate the actual area of radio coverage of base stations 610A–C. Since base stations 610A–C are not likely to be co-located and may have slightly different antenna radiation patterns, the actual boundaries of radio coverage may vary between cells 600A–C.

Each base station 610A–C is assigned a control channel frequency band denoted $F_A$–$F_C$, respectively. At least one control channel, each comprising a frequency pair, is assigned to base stations 610A–C from each frequency band $F_A$–$F_C$, respectively. In the frequency duplex arrangement used by the exemplary GSM-900 embodiment, control channels are paired: one for downlink and one for uplink and are offset by 45 MHz. As it is necessary for subscribers 660a–e to locate a particular base station 610A–C associated with particular independent radio communication system, each base station 610A–C must broadcast its control channel on a different frequency. The control channel frequencies which are assigned are known to the mobile stations 660a–e before hand so that a mobile station entering the cell may locate the particular base station belonging to the independent radio communication system with which the mobile station desires communication.

As an alternative, the control channel frequencies of base stations 610A–C may hop according to a predetermined frequency plan. In this alternative, once a mobile station has detected three frequencies from a base station, it can determine the pattern and is able to communicate over the control channel with the base station.

According to the first embodiment of the invention, the remainder of the frequency bands in the frequency range are shared by all three independent radio communication systems as traffic channels. One example of how the present invention allocates frequency bands is illustrated graphically in FIG. 7 and in tabular format in Table 1.

TABLE 1

Exemplary Channel Assignments according to a First Embodiment

| | Independent Radio communication system | | |
|---|---|---|---|
| | A | B | C |
| Reverse BCCH Frequency Band (MHz) | 890.0–890.2 | 890.4–890.6 | 890.8–891.0 |
| Forward BCCH Frequency Band (MHz) | 935.0–935.2 | 935.4–935.6 | 935.8–936.0 |
| Traffic uplink Frequency Bands (MHz) | | 891.2–915.0 | |
| Traffic Downlink Frequency Bands (MHz) | | 936.2–960.0 | |

Figure 7:
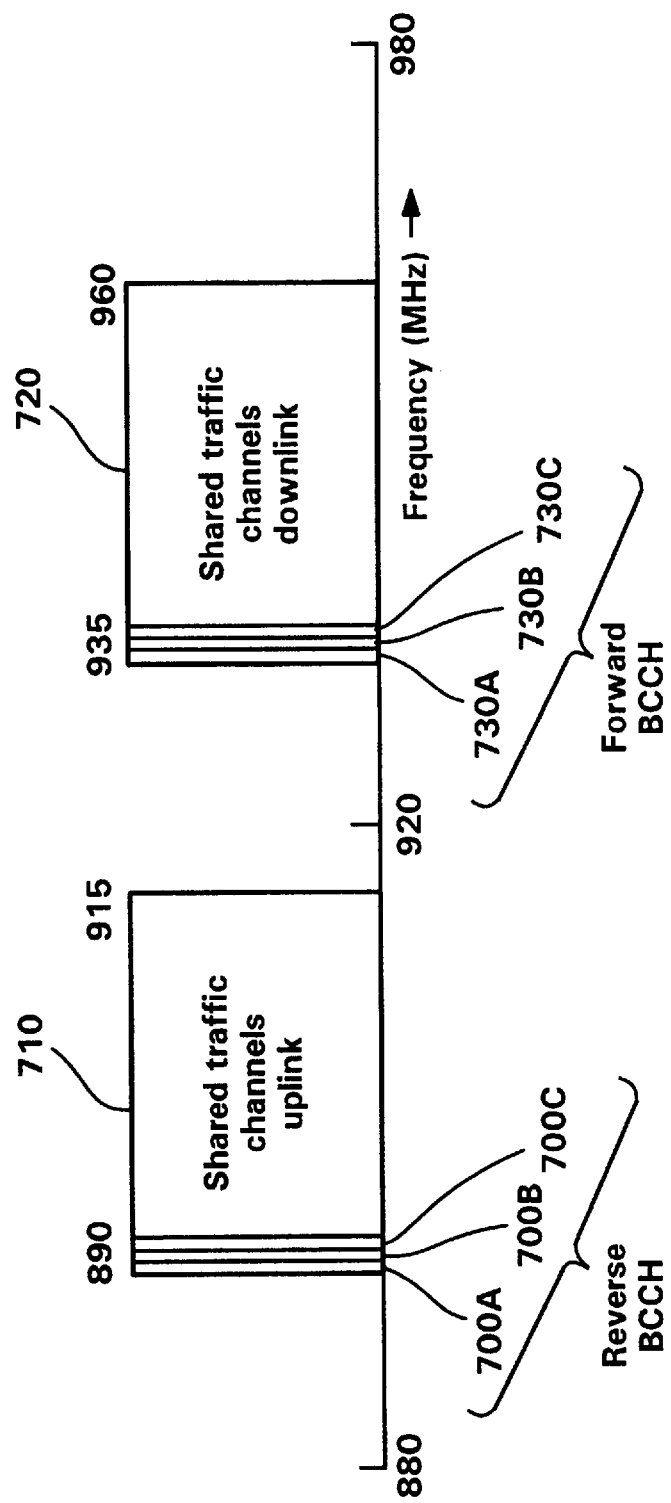
FIG. 7 is an illustration of cellular network frequency assignments according to a first embodiment of the invention.

A 200 kHz guard band is placed between each uplink control channel 700A–C and each downlink control channel 730A–C. A guard band is also placed between the control channels and the uplink 710 and downlink 720 traffic channels. FIG. 7 and Table 1 illustrate a specific example of GSM-900 where each base station 610A–C broadcasts over one control channel 730A–C, respectively. It is possible, and indeed likely, that each base station 610A–C will broadcast over more than one control channel and that the control channels will be located anywhere in the specified frequency range.

According to the first embodiment of the invention, independent radio communication systems A, B, and C allocate specific traffic channel pairs from the shared traffic channels 710 and 720 to mobile stations on an uncoordinated and unsynchronized basis using, for example, slow frequency hopping. By sharing the traffic channels on an uncoordinated basis, the need for frequency planning is simplified. This greatly enhances the ease by which new independent radio communication systems may enter the frequency range. This embodiment has particular application to supplying emergency communications where time and circumstances may not permit frequency planning and several independent radio communication systems need to be quickly installed.

Use of slow frequency hopping is particularly attractive as it is already an option built into GSM equipment as a means to improve the efficiency of channel coding and interleaving. The principle of slow frequency hopping is that every mobile station transmits bursts in an assigned time slot on a sequence derived from an algorithm. The frequency hopping occurs during the time between bursts so the mobile transmits, or receives, on one frequency in one time slot (TS) and then "hops" to another frequency before the next TS on the next TDMA frame. The frequency hopping is accomplished by adjusting the mobile station's or base station's frequency synthesizer according to known methods.

Figure 8:
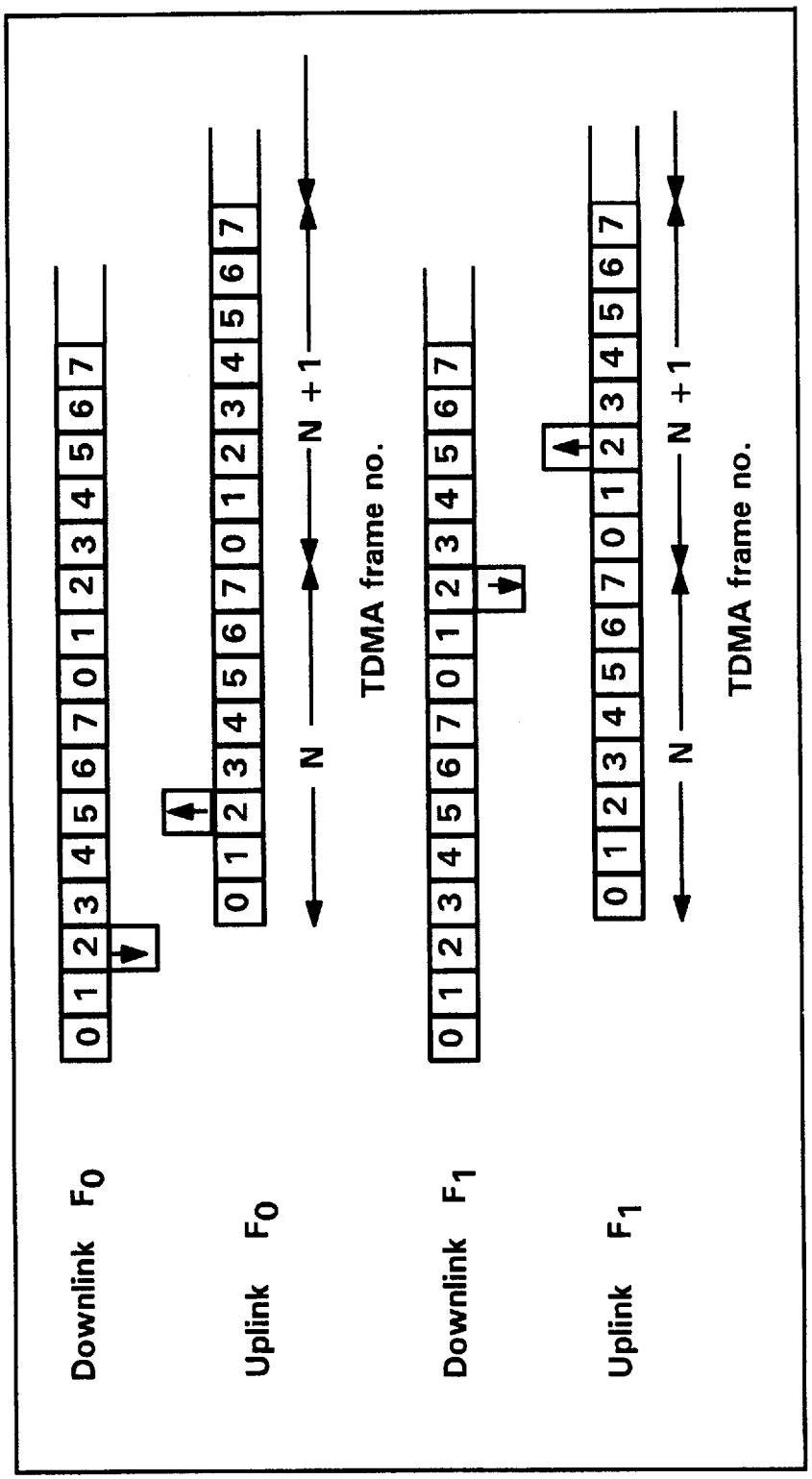
FIG. 8 is an illustration of frequency hopping used in a first embodiment of the invention.

FIG. 8 illustrates frequency hopping as used on a communications link in the first embodiment of the invention. Since the uplink and downlink frequencies are duplex frequencies (i.e., 45 MHz separation for GSM-900), the FO downlink in FIG. 8 is exactly 45 MHz offset from the FO uplink, for example. The frequency changes for each burst resulting in a hopping rate of about 217 hops per second. In a first alternative of the present invention, the physical channel supporting the forward 700A–C and reverse 730A–C control channels does not hop. This allows mobile stations entering the cells 600A–C to locate the control channel of a particular system. As an alternative, the control channel frequencies of the base stations may hop according to a predetermined pattern. One method of frequency hopping for control channels is specified in commonly assigned U.S. Patent Application, Frequency Hopping Control Channels, Ser. No. 140,560, filed on Oct. 25, 1993, now U.S. Pat. No. 5,537,434. This application is hereby incorporated by reference.

Hopping sequences of traffic channels for all mobiles connected to a particular base station of base stations 610A–C may also be synchronized. By synchronizing and coordinating the frequency hopping on at least one base station, mobiles connected to that base station will not create interference for one another.

Each base station 610A–C may further be assigned a frequency hopping algorithm designed to limit as much as possible the number of collisions in the region served by the base stations 610A–C. However, collisions (i.e., two mobiles transmitting or receiving on the same frequency at the same, or nearly the same time) will occasionally occur since there may be no synchronization or coordination of the hopping patterns between base stations. In most cases the information will be recoverable due to the channel coding and interleaving contained within the bursts. As the number of mobile stations operating in a particular region increases, the likelihood of collision increases resulting in a reduced C/I and degraded signal quality. It is therefore understood that some loss of spectral efficiency will occur as compared to a synchronized, coordinated system. However, this is more than offset by the ease in which new independent radio communication systems can be licensed to operate in the existing spectrum.

A second embodiment of the invention will now be described with reference to FIGS. 6 and 9. In the second embodiment each independent radio communication system may be assigned (i.e., licensed) a portion of the frequency range for exclusive use and another portion of the frequency range is shared by all three independent radio communication systems A, B, and C. As before, the use of three independent radio communications systems in this embodiment is for exposition only. According to the present invention, there could be any number, N, greater than or equal to two, comprising a plurality of independent radio communications systems.

Figure 9:
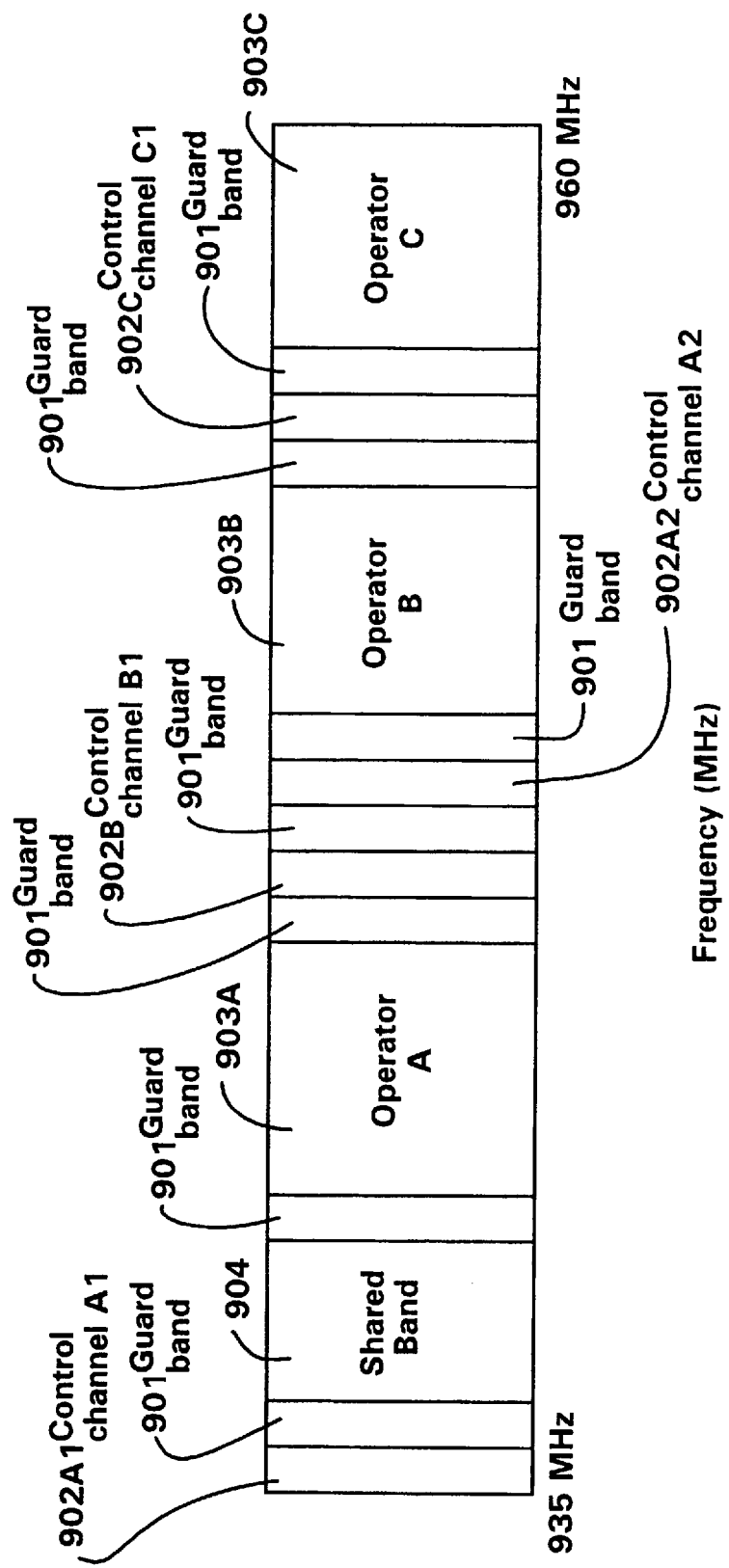
FIG. 9 is an illustration of cellular network frequency assignment according to a second embodiment of the invention.

FIG. 9 illustrates GSM-900 downlink frequency assignment according to a second embodiment of the invention. The frequency plan of the uplink frequency range (not shown) is the same as that shown for the downlink in FIG. 9 but offset by 45 MHz.

With reference to FIGS. 6 and 9, a first independent radio communication system A broadcasts over two control channels, control channel A1 on one frequency band 902A1 and control channel A2 on another frequency band 902A2. The first independent radio communication system A assigns traffic channels in the cell from a portion of the frequency range 903A used only by the first independent radio communication system.

A second independent radio communication system B broadcasts one control channel B1 on frequency 902B and assigns traffic channels from a portion of the frequency range 903B used only by independent radio communication system B.

Similarly, a third independent radio communication system C broadcasts one control channel C1 on frequency 902C and assigns traffic channels from a portion of the frequency range 903C used only by independent radio communication system C.

One or more 200 kHz guard bands 901 exist between the frequency bands used by the independent radio communication systems A, B, and C.

According to the second embodiment of the present invention, there exists a portion of the frequency range 904 which is used by all three systems A, B, and C, and, from which traffic channels are assigned to mobile stations 660a–e on an uncoordinated and unsynchronized basis using, for example, slow frequency hopping.

Figure 10:
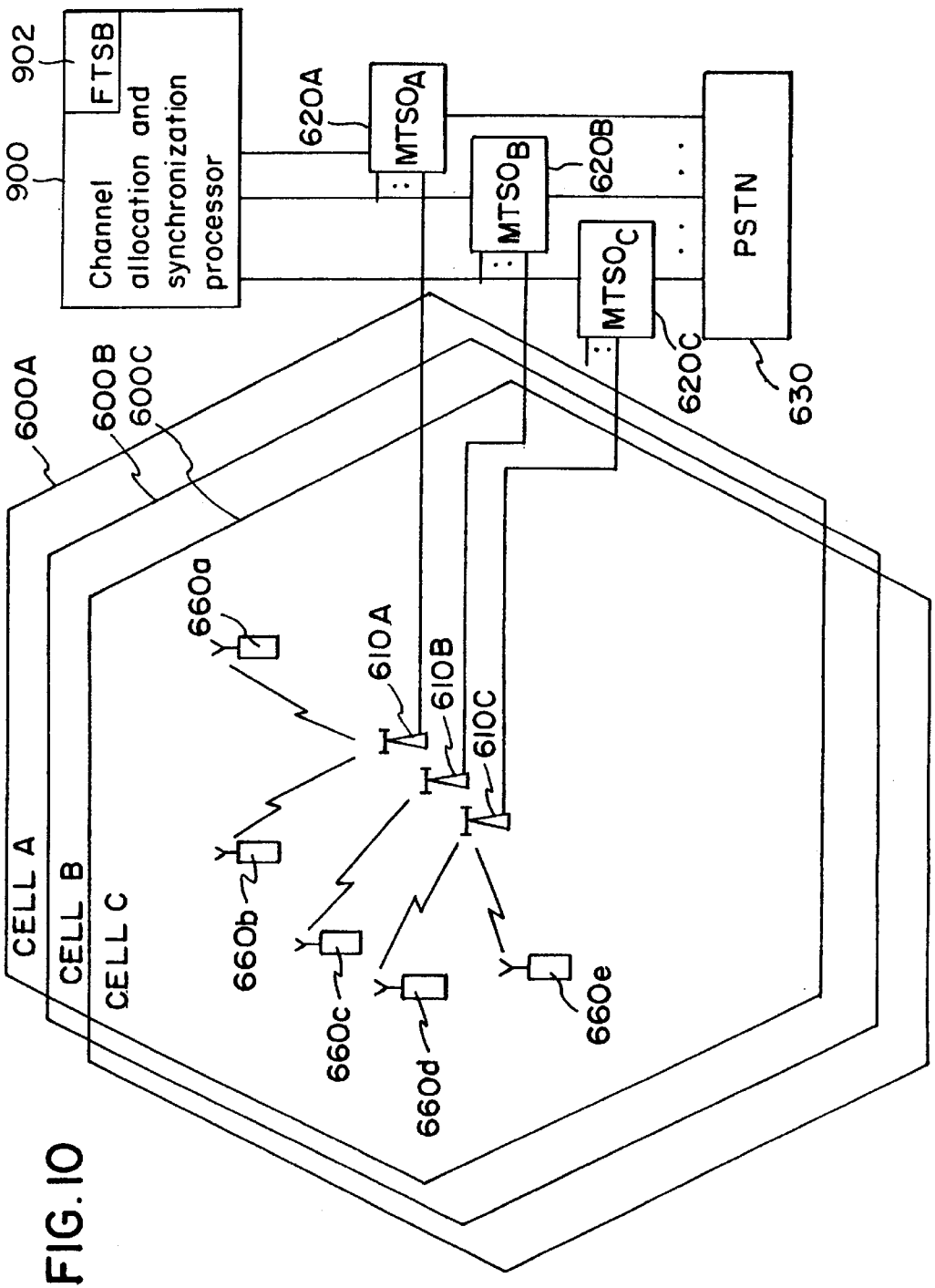
FIG. 10 is an illustration of a cellular network structure according to a third embodiment of the present invention.

Referring now to FIG. 10, therein is illustrated a third embodiment of the present invention. In the third embodiment of the invention either the first or second embodiment may be modified so that base stations 610A–C operate in a synchronized and coordinated manner to share frequency bands. Since use of shared frequency bands in an unsynchronized and uncoordinated manner results in a reduction in spectral efficiency, it is anticipated that after a time the demands of spectral efficiency will cause the operators of the independent radio communication systems A, B, and C to want to operate in a synchronized and coordinated manner.

As illustrated in FIG. 10, MTSO$_A$-MTSO$_C$ 620A–C are each connected to a channel allocation and synchronization processor 900. Channel allocation and synchronization processor 900 provides a master time reference which enables base stations 610A–C to transmit TDMA time frames in synchronization with one another. Such synchronization provides the basis for base stations 610A–C and mobile stations 660a–e to operate in a non-interfering manner with one another. Channel allocation and synchronization processor 900 also assigns channels (i.e., frequencies and time slots) and frequency hopping patterns to maximize the spectral efficiency of systems A, B, and C having substantially overlapping cells 600A–C.

Figure 11:
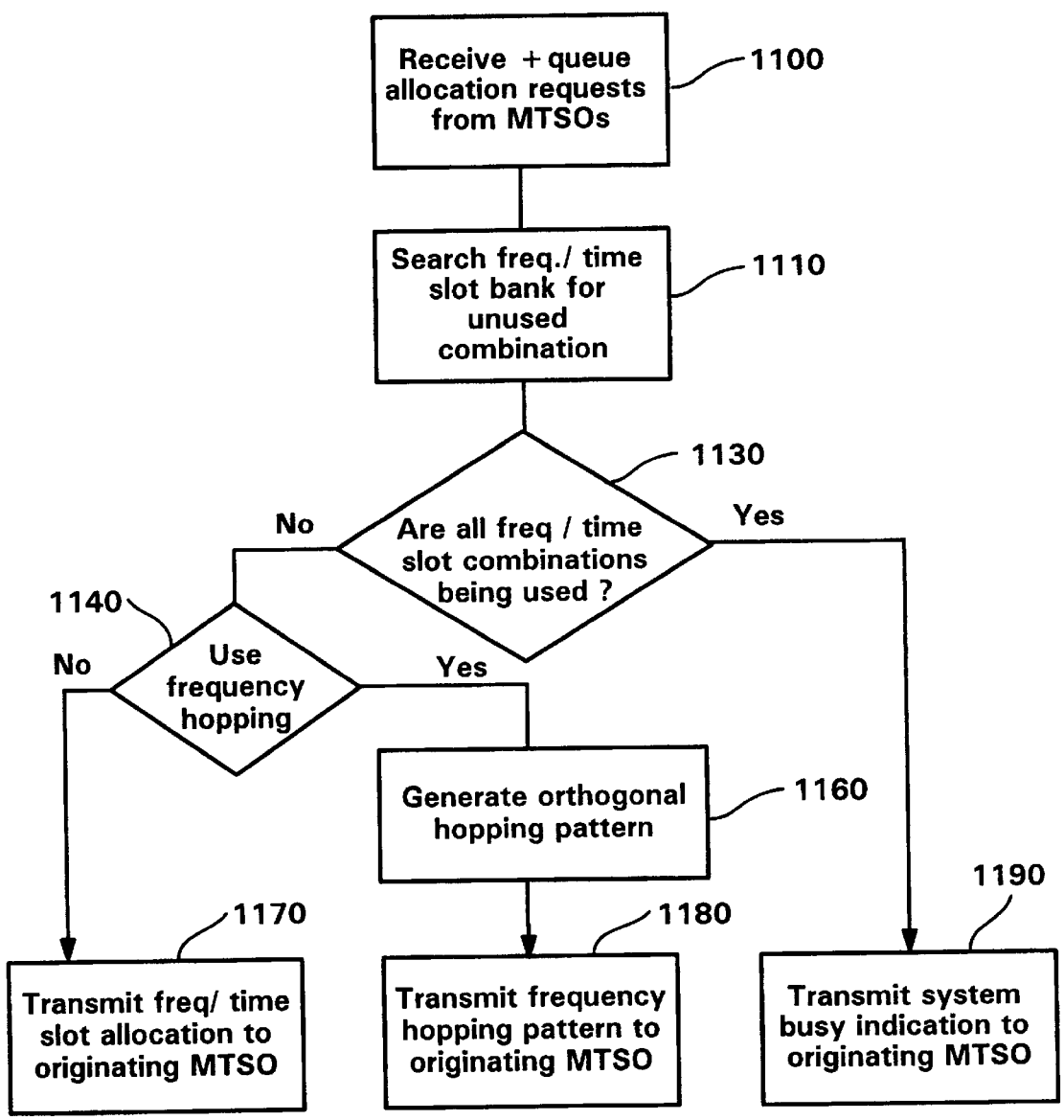
FIG. 11 is a flowchart illustrating a method of assigning TDMA channels in a cellular network.

Referring now to FIG. 11, therein are illustrated the process steps for the method in which the channel allocation and synchronization processor 900 allocates channels (i.e., frequency and time slot combinations) and frequency hopping patterns. The process begins at step 1100 where the channel allocation and synchronization processor 900 receives an allocation request from MTSO$_A$, MTSO$_B$, or MTSO$_C$. Channel allocation requests are placed in a queue in the order received. Each channel allocation request is processed sequentially. Next at step 1110, a frequency/time slot bank (FTSB) 902 within the channel allocation and synchronization processor 900 is searched for unused combinations. The frequency and time slot bank 902 is a memory device which contains a list of the shared frequency bands, for example, portions 710 and 720 of FIG. 7. The eight TDMA time slots associated with each frequency band are also stored in the frequency and time slot bank 902. The search algorithm involved at step 1110 may either select unused frequency/time slot combinations at random or, select unused combinations so that all the time slots on each frequency band are filled before another frequency band is selected. A frequency and time slot combination or, an indication that there are no unused frequency and time slot combinations available, results from the search of the frequency/time slot bank 902. Next, at step 1130, the results of the frequency/time slot bank are examined. If there are unused frequency and time slot combinations available, the process moves to step 1140 and a determination as to whether or not frequency hopping will be used is made. If no frequency hopping is to be used, the process moves to step 1170 and the frequency and time slot information is transmitted back to the originating MTSO. If frequency hopping is used, the process moves to step 1160 and generates an orthogonal frequency hopping pattern, in a manner known to those skilled in the art. For example, in GSM-900 both base stations 610A–C and mobile stations 660a–e have preprogrammed specific frequency hopping algorithms. In this case, at step 1160, the process would generate an index value to be used by the frequency hopping algorithms to generate the actual frequency hopping patterns. When frequency hopping is used, no specific frequency and time slot information is allocated to the MTSO. Rather, after generating the orthogonal frequency hopping pattern at step 1160, the process moves to step 1180 where the frequency hopping index is transmitted to the originating MTSO. If, however, at step 1130 it is determined that there are no unused frequency and time slot combinations available (i.e., the system is fully loaded), the process moves to step 1190 where processor 900 generates a system busy indication that is transmitted to the originating MTSO.

In the process shown in FIG. 11, the originating MTSO would receive either a frequency and time slot allocation, a frequency hopping index, or a system busy indication. Upon receipt of any of these, the MTSO would set up traffic channels or block access for one or more of the mobile stations 660a–e. The setup of traffic channels or blocking of access may be done according to known techniques such as described, for example, in the training document entitled *CME 20 System Training Document*, EN/LZT 120 226 R3A published by and available from Ericsson Radio Systems AB, S-164 80 Stockholm, Sweden.

So far, the present invention has been described with respect to independent radio communication systems that all operate according to the same system standard having the same multiple access technique. According to a fourth embodiment of the invention, independent radio communication systems operating according to different system standards having different multiple access techniques are designed to share a portion of a predetermined frequency range.

Figure 12:
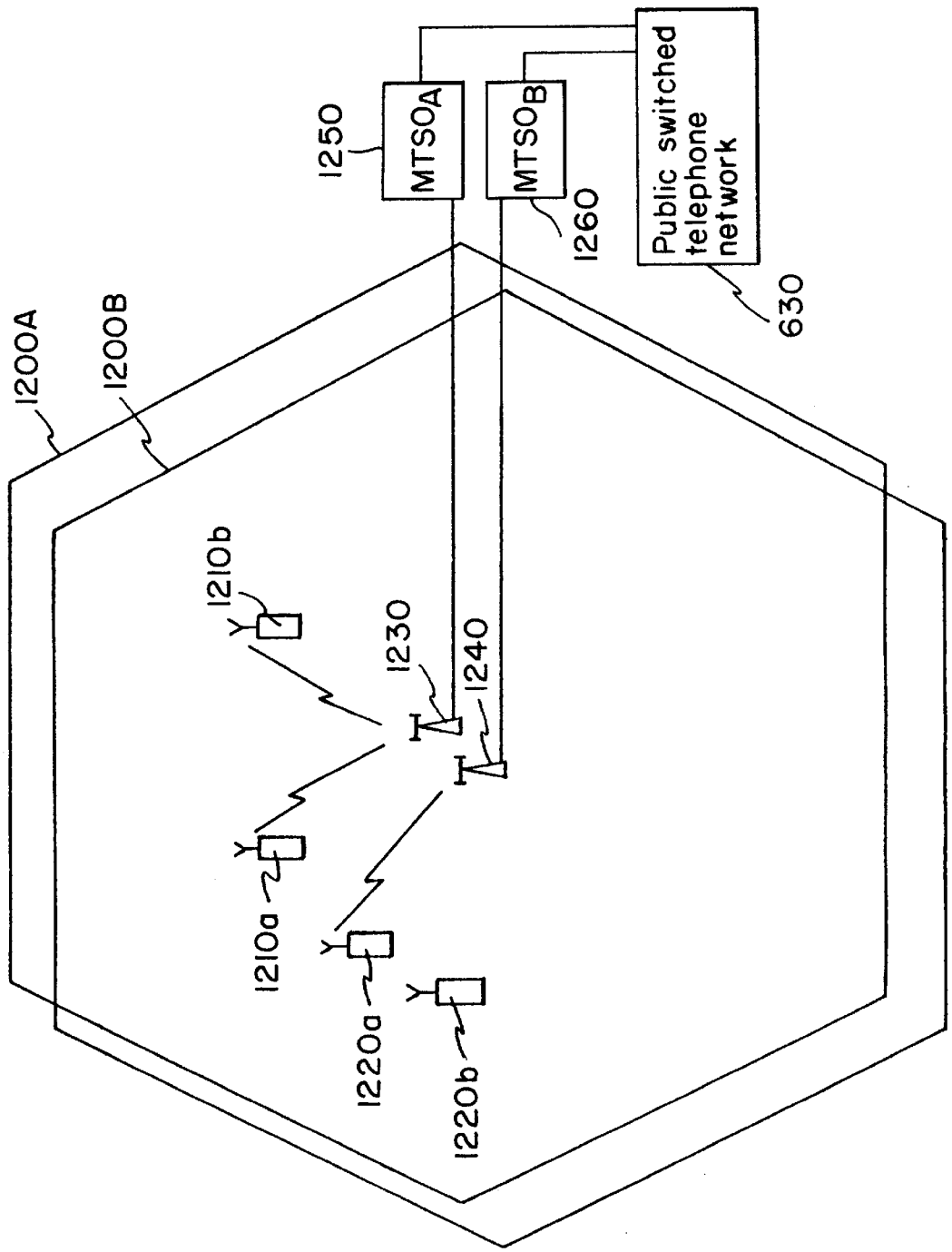
FIG. 12 is an illustration of a fourth embodiment of the present invention wherein independent TDMA and DS-CDMA radio communication systems share a portion of a predetermined frequency range.

Referring now to FIG. 12, therein is illustrated a fourth embodiment of the present invention having two independent radio communication systems. A first base station 1230 is designed to provide radio communications within a first cell 1200A using a first multiple access technique such as, for example, that specified in the IS-54B system standard. A second base station 1240 is designed to provide radio communications within a second cell 1200B using a second multiple access technique such as, for example, DS-CDMA as described by the IS-95 standard. The IS-54B and IS-95 system standards are hereby incorporated by reference. U.S. Pat. No. 5,351,269 entitled *Overlaying Spread Spectrum CDMA Personal Communications System* herein incorporated in its entirety by reference, describes one such way in which a DS-CDMA and a TDMA/FDMA system may co-exist without causing interference in a shared band. The DS-CDMA system normally broadcasts a control channel using spread spectrum techniques in the shared band.

According to the fourth embodiment of the present invention, the control channel of the DS-CDMA system is modified so that both base station 1230 and base station 1240 broadcast a TDMA/FDMA control channel on a pre-determined frequency band. In this manner, mobile stations 1210a–b and 1220a–b can locate the desired base station.

Figure 13:
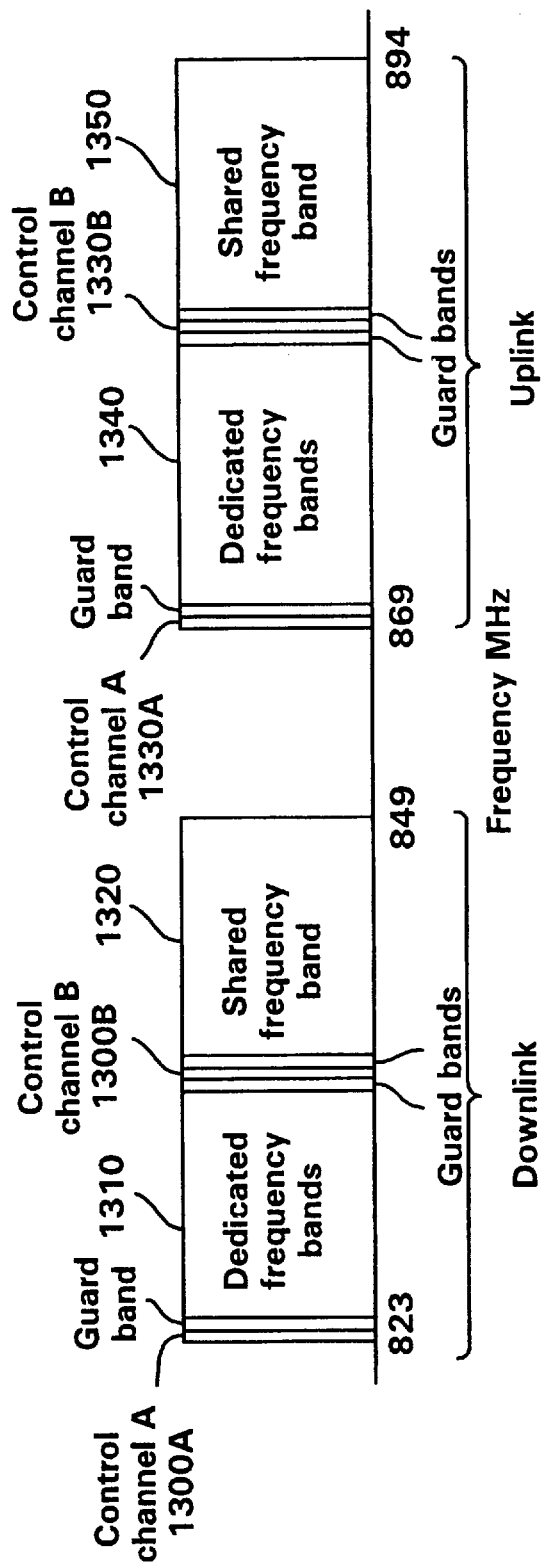
FIG. 13 is an illustration of how the IS-54B frequency range may be shared between two different multiple access systems.

Referring now to FIG. 13, therein is illustrated a frequency plan according to a fourth embodiment of the invention. The frequency range used in this example is the frequency range set aside in North America for IS-54B. IS-54B uses a frequency duplex arrangement similar to that described for GSM-900 so uplink and downlink channels are paired.

With reference to FIGS. 12 and 13, base station 1230 broadcasts a control channel 1300A in the region defined by the boundaries of cell 1200A. Base station 1230 provides TDMA radio communication to mobile stations 1210a–b using frequency bands from the dedicated frequency bands 1310 or, alternatively, from frequency bands within the shared frequency bands 1320. DS-CDMA base station 1240 broadcasts on the modified control channel 1300B in the region defined by the boundaries of cell 1200B. The coverage areas of cells 1200A and 1200B are substantially overlapping. Base station 1240 provides DS-CDMA radio communications to mobile stations 1220a–b over the entire shared frequency band (i.e., across all of the frequency bands). Since DS-CDMA requires a wide bandwidth, the shared frequency bands must cover a contiguous band wide enough to support the DS-CDMA bandwidth.

While the present invention has been described with respect to particular embodiments, those skilled in the art will recognize that the present invention is not limited to the specific embodiments described and illustrated herein. Different embodiments and adaptations besides those shown and described, along with variations, modifications and equivalent arrangements, are reasonably suggested by the foregoing specification and drawings without departing from the substance or scope of the invention. Accordingly, it is intended that the invention be limited only by the spirit and scope of the claims appended hereto.

What is claimed is:

1. In a cellular radio communication network operating over a predetermined frequency range subdivided in frequency into frequency bands, said network comprising at least a first independent radio communication system and a second independent radio communication system each providing radio telecommunication service over a common geographic region, a method for using said frequency range comprising the steps of:
   assigning from said predetermined frequency range at least one first frequency band to be used as a control channel by said first independent radio communication system;
   assigning from said predetermined frequency range at least one second frequency band to be used as a control channel by said second independent radio communication system; and
   sharing by said first independent radio communication system and said second independent radio communication system frequency bands in the portion of said predetermined frequency range not assigned as control channels to provide radio telecommunication service to a plurality of subscribers located in said common geographic region.

2. The method of claim 1 wherein said step of sharing comprises sharing without coordination or synchronization between said first independent radio communication system and said second independent radio communication system.

3. The method of claim 1 wherein said step of sharing comprises sharing in a coordinated and synchronized manner between said first independent radio communication system and said second independent radio communication system.

4. The method of claim 3 wherein said step of sharing comprises the steps of providing a master time reference to the first and second independent radio communication systems for synchronization of operation.

5. The method of claim 3 wherein said step of sharing comprises the step of assigning frequency and time slot combinations in response to channel set-up requests received from said first independent radio communication system and said second independent radio communication system.

6. The method of claim 3 wherein said step of sharing comprises the step of assigning frequency hopping patterns in response to channel set-up requests received from said first independent radio communication system and said second independent radio communication system.

7. The method of claim 1 further comprising the step of using slow frequency hopping across the unassigned frequency bands to provide radio telecommunication service to the plurality of subscribers.

8. The method of claim 1 wherein said first independent radio communication system and said second independent radio communication system are designed to provide radio telecommunication services using TDMA.

9. In a cellular radio communication network operating over a predetermined frequency range subdivided in frequency into frequency bands, said network comprising at least a first independent radio communication system and a second independent radio communication system each providing radio telecommunication service over a common geographic region, a method for using said frequency range comprising the steps of:
   assigning from said predetermined frequency range at least one first frequency band to be used as a control channel by said first independent radio communication system;
   assigning from said predetermined frequency range at least one second frequency band to be used as a control channel by said second independent radio communication system;
   assigning from said predetermined frequency range a predetermined portion of said predetermined frequency range to be used by said first independent radio communication system to provide radio telecommunication service to a plurality of subscribers located in said geographic region; and
   sharing by said first independent radio communication system and said second independent radio communication system frequency bands in the portion of said predetermined frequency range not assigned as control channels or assigned exclusively to said first independent radio communication system, to provide radio telecommunication service to the plurality of subscribers located in said geographic region.

10. The method of claim 9 wherein said step of sharing comprises sharing without coordination or synchronization between said first independent radio communication system and said second independent radio communication system.

11. The method of claim 9 wherein said step of sharing comprises the steps of providing a master time reference to the first and second independent radio communication systems for synchronization of operation.

12. The method of claim 9 wherein said step of sharing comprises sharing in a coordinated and synchronized manner between said first independent radio communication system and said second independent radio communication system.

13. The method of claim 12 wherein said step of sharing is controlled by a processor which assigns frequency and time slot combinations in response to channel set-up requests received from said first independent radio communication system and said second independent radio communication system.

14. The method of claim 12 wherein said step of sharing comprises the step of assigning frequency hopping patterns in response to channel set-up requests received from said first independent radio communication system and said second independent radio communication system.

15. The method of claim 9 further comprising the step of using slow frequency hopping across the unassigned frequency bands to provide radio telecommunication service to the plurality of subscribers.

16. The method of claim 9 wherein said first independent radio communication system and said second independent radio communication system are designed to provide radio telecommunication services using TDMA.

17. In a cellular radio communication network comprising a plurality of systems each providing service within a common geographic area, and operating within a frequency range comprising a plurality of frequency bands, a method of allocating frequency bands to said systems, said method comprising the steps of:

assigning one or more first frequency bands to each of said systems, wherein said first frequency bands are used exclusively for control channels within the systems to which each is assigned; and allocating one or more second frequency bands to said systems on a shared basis, wherein said second frequency bands are used for traffic channels within the system to which each is currently allocated.

18. The method of claim 17 wherein said step of allocating comprises:

allocating frequency bands from said second frequency bands for traffic channels within a first one of the plurality of systems independently of the allocation of said second frequency bands within a second one of the plurality of systems.

19. The method of claim 18 wherein said step of allocating comprises:

allocating frequency bands from said second frequency bands for traffic channels within said first system by slow frequency hopping.

20. The method of claim 17 wherein said step of allocating comprises:

allocating one or more second frequency bands to each of said systems depending on the allocation of said second frequency bands to the other systems of said network.

21. The method of claim 20 wherein said plurality of systems communicate over time division multiplexed channels, each channel defined by a frequency band and a time slot assignment, and wherein said step of allocating comprises:

receiving a channel allocation request from an originating one of said systems;

determining if channels are available in said network; and in response to an affirmative determination:

transmitting a channel allocation assignment to said originating system.

22. The method of claim 21 wherein said step of determining if channels are available in said network comprises searching for unused frequency/time slot combinations.

23. The method of claim 21 wherein said step of transmitting comprises the step of transmitting a frequency hopping pattern to said originating system.

24. The method of claim 23 wherein said step of transmitting the frequency hopping pattern comprises the steps of:

generating an orthogonal frequency hopping pattern; and transmitting said orthogonal frequency hopping pattern to said originating system.

25. The method of claim 20 wherein said plurality of systems communicate over time division multiplexed channels, each channel defined by a frequency band and a time slot assignment, and wherein said step of allocating comprises:

receiving a channel allocation request from an originating one of said systems;

determining if channels are available in said network; and in response to a negative determination:

transmitting a channel busy indication to said originating system.

26. The method of claim 17 in which said step of assigning further comprises the step of:

assigning one or more third frequency bands to one or more of said systems, said third frequency bands to be used exclusively for traffic channels within the system to which each is assigned.

27. The method of claim 17 wherein a first one of the plurality of systems is a time/frequency division multiplexed system and a second one of the plurality of systems is a code division multiple access system, each of said first and second systems broadcasting on one or more time/frequency division multiple access control channels.

28. The method of claim 27 wherein said step of assigning further comprises the step of:

assigning one or more third frequency bands to said first system, said third frequency bands to be used as traffic channels in said first system.

29. A cellular communications network providing service over a frequency range comprising a plurality of first frequency bands and a plurality of second frequency bands, said network comprising:

a plurality of radio communications systems, each of said systems providing service in a coverage area, the coverage areas of each of said systems having a common area, each of said systems being exclusively assigned one or more of said first frequency bands for use as control channels for each system and providing service over said plurality of second frequency bands on a shared basis.

30. The cellular communications network of claim 29 in which each of said radio communications systems comprises means for allocating said second frequency bands for communications independently of the allocation of said second frequency bands within each other system.

31. The cellular communications network of claim 29 in which one or more of said systems is exclusively assigned one or more fixed frequency bands for providing service in addition to providing service over said plurality of shared frequency bands.

32. The cellular communications network of claim 29 further comprising means for allocating said shared frequency bands for communications on a coordinated and synchronized basis.

33. The cellular communications network of claim 29 in which said plurality of radio communications systems comprises a DS-CDMA system and a TDMA system, each of said systems having one or more TDMA control channels.

34. The cellular communications network of claim 29 further comprising means for assigning said one or more of said first frequency bands for use as control channels on a frequency hopping basis.

35. The cellular communications network of claim 29 in which each of said radio communications systems comprises one or more mobile telephone switching offices, and said network further comprises means for allocating unused frequency bands of said second frequency bands among said systems on a shared basis, said means for allocating connected to each of said mobile telephone switching offices.

36. The cellular communications network of claim 35 in which said means for allocating comprises a channel allocation and synchronization processor.

37. The cellular communications network of claim 36 in which said channel allocation and synchronization processor comprises:
- means for receiving a frequency band allocation request from an originating system of said systems;
- means for determining if frequency bands are available in said network; and
- means for transmitting a frequency band allocation assignment to said originating system in response to an affirmative determination.

38. The cellular communications network of claim 36 wherein said plurality of radio communications systems comprises a plurality of systems communicating over time division multiplexed channels, each channel defined by a frequency band and a time slot assignment, and wherein said means for allocating comprises:
- means for receiving a channel allocation request from an originating system of said systems;
- means for determining if channels are available in said network; and
- means for transmitting a channel allocation assignment to said originating system in response to an affirmative determination.

39. The cellular communications network of claim 38 wherein said means for determining comprises a frequency/time slot bank for storing unused frequency/time slot combinations.

40. The cellular communications network of claim 38 wherein said means for transmitting comprises means for transmitting a frequency hopping pattern to said originating system.

41. The cellular communications network of claim 40 wherein said means for transmitting the frequency hopping pattern comprises:
- means for generating an orthogonal frequency hopping pattern; and
- means for transmitting said orthogonal frequency hopping pattern to said originating system.

* * * * *